United States Patent [19]

Davidson et al.

[11] Patent Number: 5,062,088
[45] Date of Patent: Oct. 29, 1991

[54] ACOUSTIC MEASURING SYSTEM

[75] Inventors: Amber C. Davidson, Salt Lake City; Ernie Vandenwijngaert, Logan, both of Utah

[73] Assignee: Lundahl Instruments, Inc., Logan, Utah

[21] Appl. No.: 594,581

[22] Filed: Oct. 9, 1990

[51] Int. Cl.⁵ .............................................. G01S 3/80
[52] U.S. Cl. .......................................... 367/127; 367/6
[58] Field of Search ...................... 367/2, 6, 118, 127, 367/901, 909

[56] References Cited

U.S. PATENT DOCUMENTS

| | | | |
|---|---|---|---|
| 4,026,654 | 5/1977 | Beaurain | 367/2 |
| 4,254,478 | 3/1981 | Dumas | 367/2 |
| 4,551,722 | 11/1985 | Tsuda et al. | 367/909 |
| 4,731,762 | 3/1988 | Hanks | 367/99 |
| 4,884,448 | 12/1989 | Ogawa | 73/597 |
| 4,894,810 | 1/1990 | Jakkala | 367/2 |
| 4,903,004 | 2/1990 | Starke et al. | 340/903 |
| 4,905,208 | 2/1990 | Dick | 367/99 |

Primary Examiner—Daniel T. Pihulic
Attorney, Agent, or Firm—Rockey & Rifkin

[57] ABSTRACT

Apparatus for sensing distances between two objects by using multiple pulses from the detector and from the object to be detected by using a transmitter and not using any reflected waves the reliability and the ability to reject clutter is improved. The periods between transmission are accurately controlled so that there is no signal returned until the object to be detected generates such a signal. As a result it is possible to accurately measure the distance between two objects and indeed the system may be used between two objects when both are in motion.

6 Claims, 4 Drawing Sheets

ACOUSTIC MEASURING SYSTEM

BACKGROUND OF THE INVENTION

Measuring distances by calculating the transit time of a pulse acoustic wave from a transmitter to a reflective surface has been known in the art. Such measuring devices include ultrasonic transmitters which direct a beam of ultrasonic energy to a distant surface. The two way transit time for the ultrasonic burst to leave the transmitter and return is measured and converted to a distance measurement.

One of the difficulties in using this technique is that reflections from surfaces other than the one desired are received and are difficult to distinguish from the main reflection also white electrical noise present in the atmosphere from the surface of interest. This means that the received reflections include unwanted echoes making accurate measurements difficult. One of the reasons for this undesirable result is the spreading of the acoustic wave. The wave as it is transmitted becomes so wide that unwanted peripheral objects as well as objects in the direct line reflect a signal back to the sensor. Many attempts have been made to control this unwanted wide wave propagation and/or reflection.

U.S. Pat. No. 4,905,208 issued to Norman R. Dick shows a means of controlling the frequency of the output and the center frequency of the response to overcome this objection. U.S. Pat. No. 4,903,004 issued to Jeffrey W. Stark attempts to overcome this objection or limitation in the use of transducers to measure distance by utilizing a plurality of transducer units at the source and at the reflected surface of both. In addition U.S. Pat. Nos. 4,884,448, 4,551,722 and 4,731,762 have utilized a variety of schemes and apparatus to minimize these reflections from obstructions and thereby maximizing the utility of many ultrasonic devices.

SUMMARY OF THE INVENTION

The present invention has been developed in order to alleviate the above described drawbacks inherent to conventional ultrasonic distance measuring systems.

It is therefore an object of the present invention to provide a new and useful ultrasonic detecting apparatus and method for accurately checking the presence of only the desired obstacles in the path of a moving vehicle, i.e., behind a backing vehicle, in front of a moving vehicle and additionally to be able to determine the distance to a moving object, such as two vehicles approaching each other.

According to a feature of the present invention ultrasonic wave pulses are intermittently transmitted and received by a second ultrasonic sensor. The second ultrasonic sensor then delays for a predetermined period of time before transmitting back to the first sensor originating the ultrasonic wave an ultrasonic wave cf its own. This permits the elimination of the reflections from obstacles causing spurious measurements.

DETAILED DESCRIPTION OF A PREFERRED EMBODIMENT OF THE INVENTION

Figure 1:
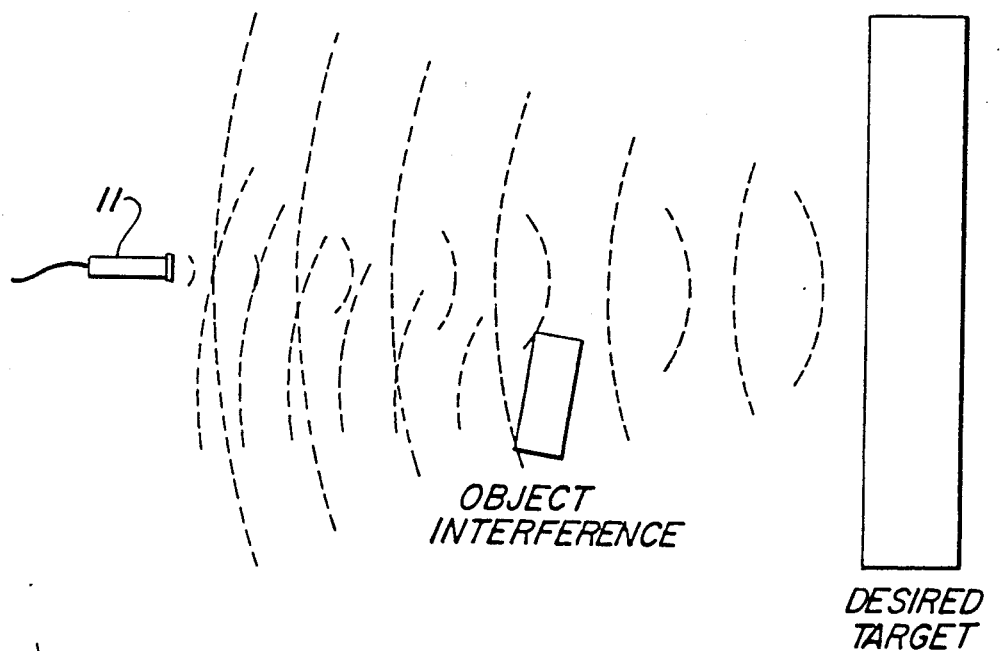
FIG. 1 is a representation of the present day ultrasonic sensing devices showing the interference caused by an object between the sensor and the desired target.
Figure 2:
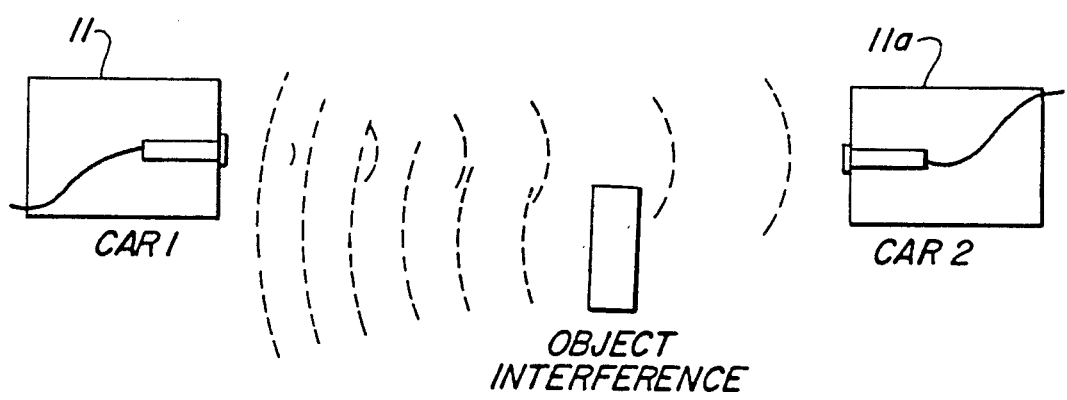
FIG. 2 is a depiction of the two sensor system of this invention illustrating how object interference is ignored.

Referring now to FIG. 2 of the drawings, a diagram of an embodiment of the apparatus according to the present invention is shown. As will be described later certain element will be actuated by a microcomputer and transducers. However, to make clear the general structure and operation of the apparatus, the apparatus will be described with reference to FIG. 2. The master sensor 11 and the repeater sensor 11a are each mounted in FIG. 2 upon a moveable vehicle such as an automobile. The master sensor sends a signal which is not disturbed by any object interferences and is subsequently received by the repeater sensor 11a. The repeater sensor 11a then sends at a predetermined time after reception of the original signal a signal back to the master sensor, so that There is now no possibility that the signal received by the master sensor was generated by an unwanted or undesired object. The example shown in FIG. 2, both automobiles are assumed to be moving and passing by all kinds of objects which could easily reflect ultrasonic signals. An ultrasonic wave is transmitted from master sensor 11 after power is applied to the master sensor a command signal is sent from the main controller. Simultaneously, the receiver portion of the transducer of the master sensor is inactivated so that the sensor cannot look for a return signal until a predetermined time has elapsed. In this example that time will be 70 milliseconds. During this period when the receiver is inactivated, echoes will not be received then detected by the master sensor, however; if the repeater sensor 11a is close enough it will pick up the signal transmitted from master sensor When the signal is detected by the repeater sensor 11a it will go into a 70 millisecond delay before the repeater sensor transmits any signal After the initial 70 milliseconds, the transmitter portion 112 of the repeater sensor 11a is activated and transmits an ultrasonic wave toward the master sensor. Since an initial 70 milliseconds has elapsed, the master receiver is now activated and begins to be able to receive ultrasonic waves especially strong signals being sent from the repeater sensor 11a. Calculating the actual distance is done by adding up the total time it takes from the transmission of the original signal from the master sensor until it has received the return signal from the repeater sensor. This time may be converted into distance in the normal way by a microprocessor 110 inasmuch as sound travels at approximately 1.8 milliseconds per foot. The master sensor will wait and transmit a second signal after 70 millisecond interval has elapsed unless a return signal has been received.

Figure 3:
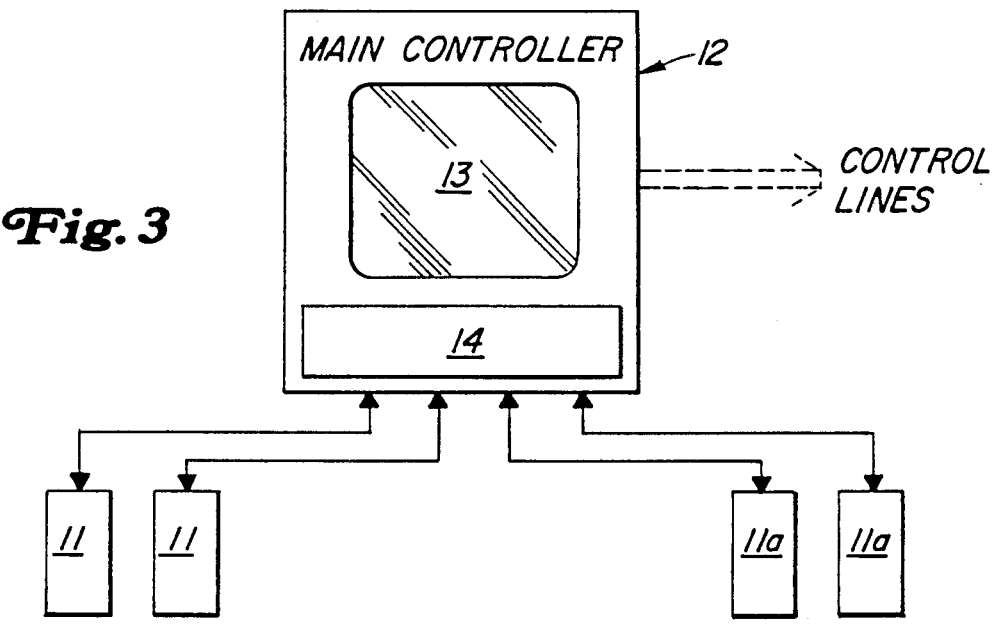
FIG. 3 is a block diagram of the embodiment of the invention showing the main elements of the apparatus which are made of discreet segments.
Figure 4:
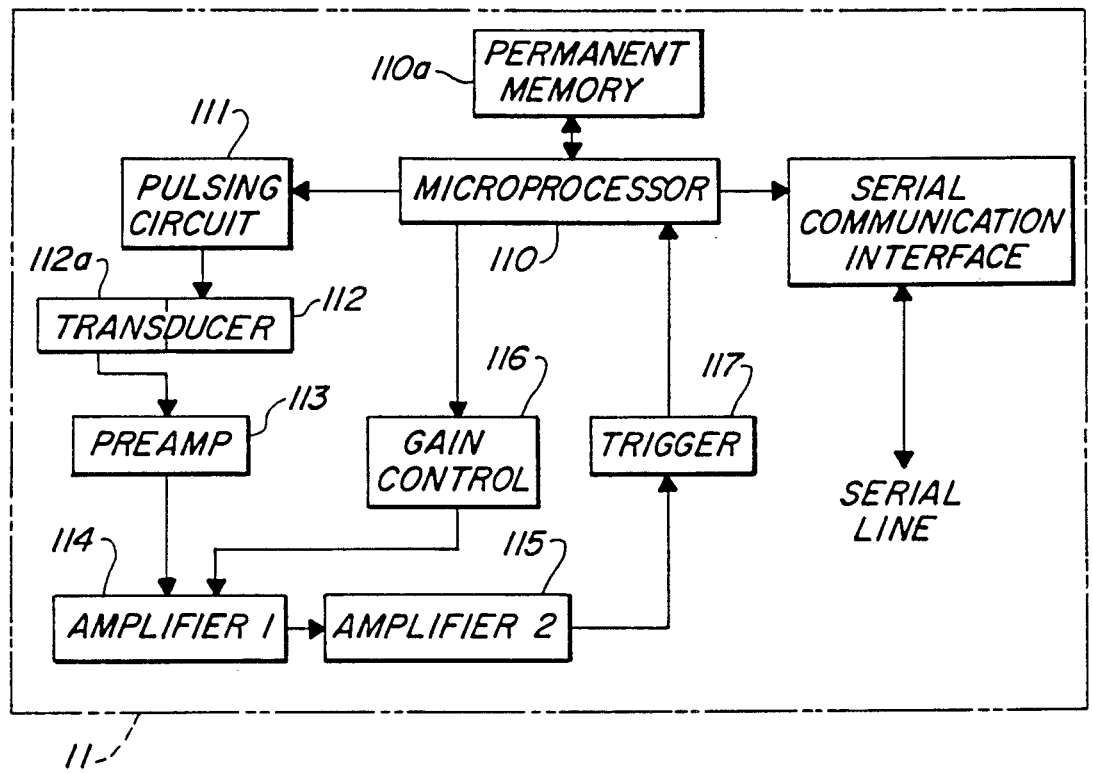
FIG. 4 is a block diagram showing a detailed structure of the sensors of this invention.

Referring now to FIG. 3 the main controller is located in the vehicle number one and consists of a display unit 13 and a key pad 14 which will permit the activation changing of timing of various components in the system. The main controller 12 lends the directive to the master sensors through the serial communication lines when to send the first ultrasonic wave. Upon receiving the desired return wave, the master sensors deliver the signal to the main controller 12 to be used by the micro computer to calculate the distance and actuate the control lines to signal sensing equipment accordingly. The repeater sensors 11a act independently of the main controller 12. They simply receive the ultrasonic signals generated by master sensors and send back an ultrasonic signal or wave 70 milliseconds after detecting an incoming ultrasonic wave from the master sensors. The serial communication lines that go to the repeater sensors are used to set the gain of the repeater sensors by the main controller. More than one master and repeater sensor can be used in order to cover a wider area, however, the system is described using only master and one repeater sensor. FIG. 4 is a block diagram of a sensor utilized in this invention and consists of a transducer having a transmitting portion 112 and a receiving portion 112a. It also has a microprocessor 110 (of the kind known in the art) including a permanent memory 110a. The transducer transmitting section is controlled by pulsing circuit 111. The ultra sonic signal is sent from the transducer 112 and after proper time lapse the receiving portion 112a of the transducer is activated will receive back a signal from the repeater sensor which is fed to the preamplifier 113 and then to amplifier 114. The gain control 116 is from the microprocessor to amplifier 1 and the signal is then fed into amplifier 115, a second amplifier. From amplifier 115 the signal goes to the trigger 117 to tell the a microprocessor 110 that a return signal has been received. This will cause the microprocessor to compute the time lapse and generate an accurate signal representing the distance between the two sensors.

Figure 5:
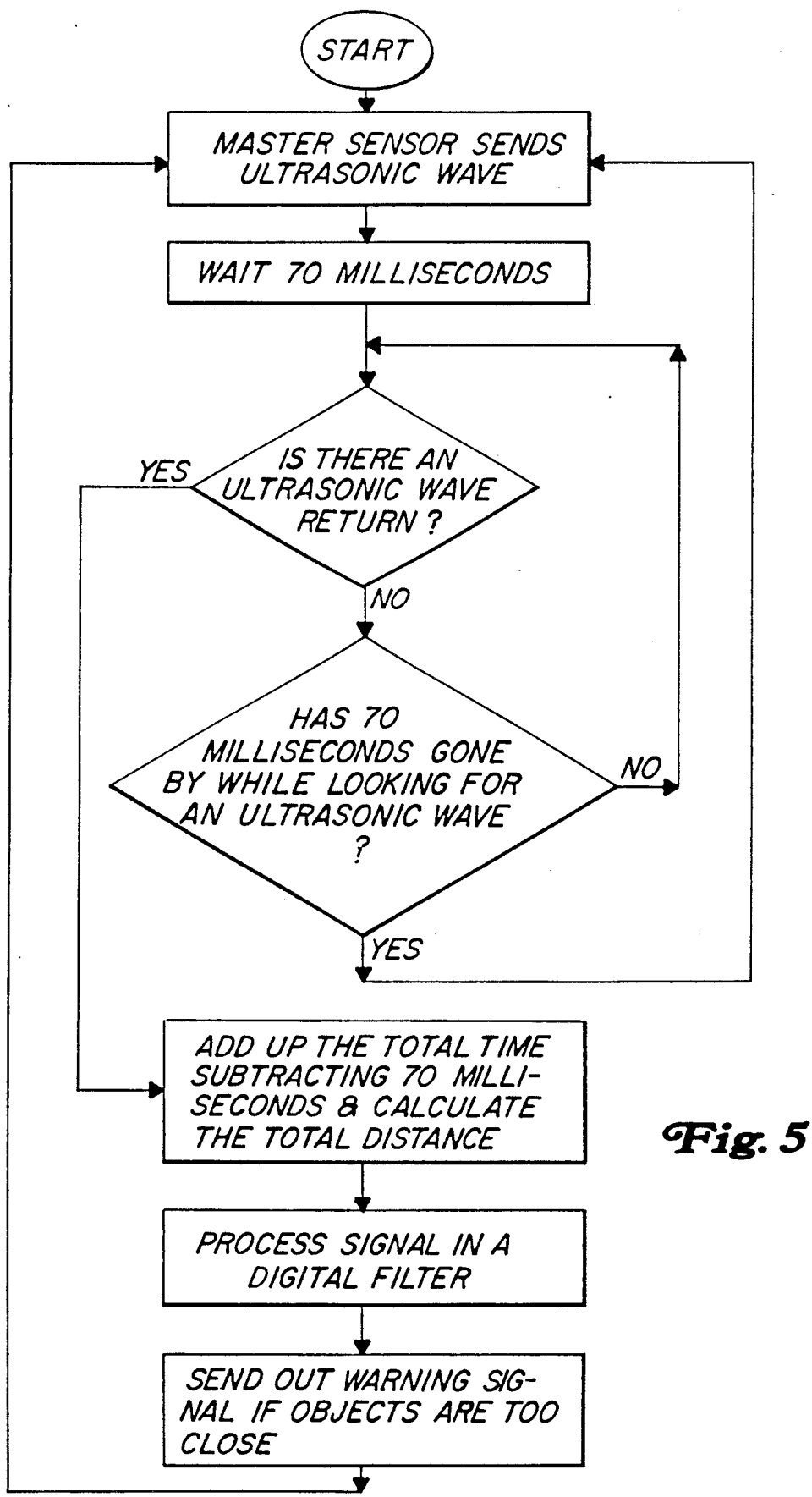
FIGS. 5 and 5a are flow charts showing the operation of the embodiment of FIG. 2.
Figure 5A:
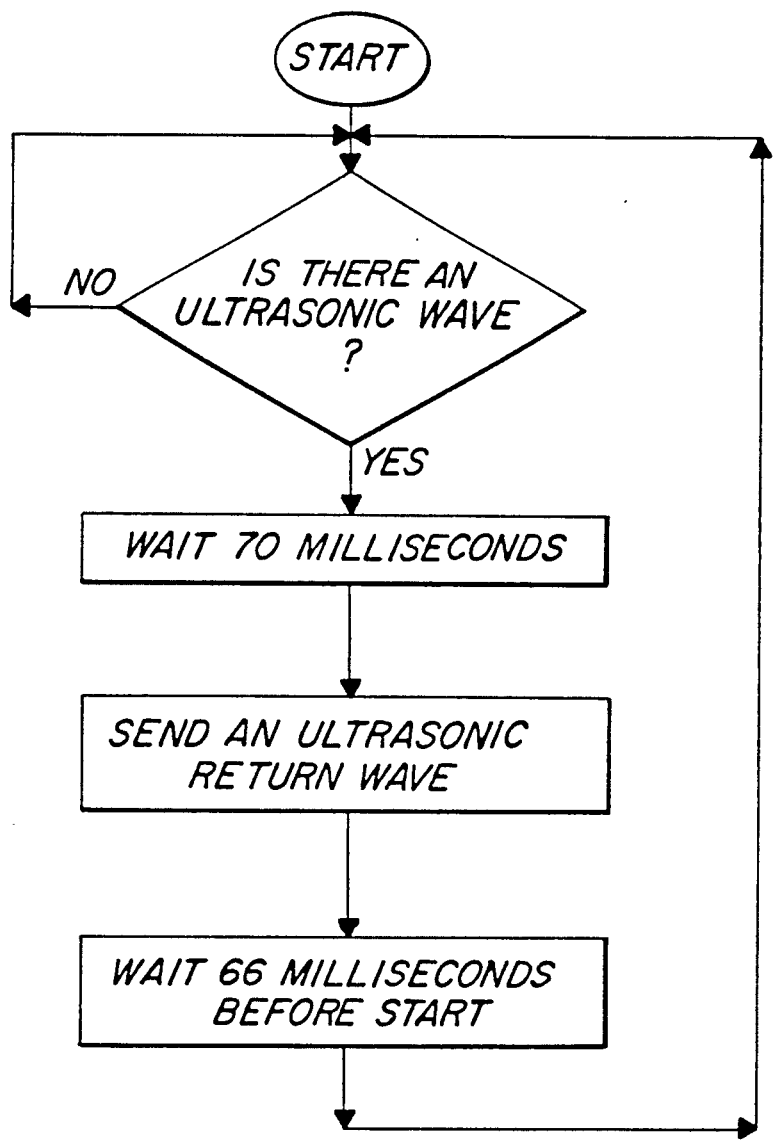

The operation of the apparatus will be further described in detail with reference to the Flow Charts 5 and 5a. An example of two cars separated by 30 feet will be used to explain the timing cycle and the operation of this apparatus in more detail. Sound travels at approximately 0.9 milliseconds per foot making 30 feet about 27 milliseconds away as shown in FIG. 2. The control circuit from the main controller is activated and the master sensor 11 sends out its first ultrasonic wave from the transducer transmitter portion 112. The repeater sensor 11a picks up this ultrasonic signal 27 milliseconds later as shown in FIG. 5a. The repeater sensor will wait 70 milliseconds before sending the return wave to the master sensor, 97 milliseconds after the origination of the first wave. After sending the return ultrasonic wave, as shown in FIG.. 5a in the Flow Chart 5a, the repeater sensor waits or is inactivated 66 milliseconds before the receiver cf the repeater sensor can receive another wave making a total lapsed time of 163 milliseconds. At 167 milliseconds, the repeater sensor 11a picks up another wave from the master sensor 11. This new wave is received only 4 milliseconds after the repeater sensor can receive signals again. This delay at the repeater sensor determines how fast the vehicles carrying the sensors can go toward each other and still allow the repeater sensor to pick up the requisite ultrasonic signals. By delaying the reception of this signal by 66 milliseconds it insures the repeater sensor does not pick up its own transmitted wave from a reflected signal.

Thus, a total of 124 milliseconds passes from the time the master sends the signal until the master receive's the return wave, i.e., 27 milliseconds out, 70 milliseconds delay plus 27 milliseconds transmission time back to the master receiver. The master sensor receiver is on from 70 milliseconds to 140 milliseconds and it is only during this time that the master can receive a signal or a ultrasonic signal of the return wave from the repeater. At the end of the 140 milliseconds, the master sensor sends out another ultrasonic wave and the cycle is repeated.

Details for the timing of the master end repeater sensors are shown in the following tables. The columns in the tables are listed as "Send Time," "Receive Time" and "Receive Window." The "Send Time" is that time during which the sensor is sending an ultrasonic wave. When the sensor is capable or has an allowable time period for looking for a wave, that time is described as the "Receive Window." The time at which the sensor picks up the wave is called the "Receive Time." Notice that each time the repeater sensor picks up a wave it is only 4 milliseconds after the repeater is in the receive window or capable of listening for a signal. All of the above timing and transmission and receiving has been with respect to when the two sensors are 30 feet apart.

| MASTER SENSOR | | |
|---|---|---|
| SEND TIME | RECEIVE TIME | RECEIVE WINDOW |
| 0 MSEC (Start) | 124 MSEC | 70–140 MSEC |
| 140 MSEC | 264 MSEC | 210–280 MSEC |
| 280 MSEC | 404 MSEC | 350–420 MSEC |

| REPEATER SENSOR | | |
|---|---|---|
| RECEIVE TIME | SEND TIME | RECEIVE WINDOW |
| 27 MSEC | | Waiting to Receive |
| | 97 MSEC | |
| 167 MSEC | | 163 MSEC and On |
| | 237 MSEC | |
| 307 MSEC | | 303 MSEC and On |

If the sensors are only 5 feet apart and moving toward each other, the timing must be changed. The column below with the same headings shows the same figures for automobiles 5 feet apart. The repeater sensor times are completely different for the illustration when the two sensors are 5 feet apart, inasmuch as the repeater sensor timing is completely dependent on the master sensor and the distance between the sensors. One common timing is that after the repeater receives the ultra sonic wave from the master sensor, it is only 4 milliseconds after such reception begins looking for a new ultrasonic signal. This is true regardless of how far apart the sensors are.

| MASTER SENSOR | | |
|---|---|---|
| SEND TIME | RECEIVE TIME | RECEIVE WINDOW |
| 0 MSEC (Start) | 79 MSEC | 70–140 MSEC |
| 140 MSEC | 219 MSEC | 210–280 MSEC |
| 280 MSEC | 359 MSEC | 350–420 MSEC |

| REPEATER SENSOR | | |
|---|---|---|
| RECEIVE TIME | SEND TIME | RECEIVE WINDOW |
| 4.5 MSEC | | Waiting to Receive |
| | 74.5 SEC | |
| 144.5 MSEC | | 140.5 MSEC and On |
| | 214.5 MSEC | |
| 284.5 MSEC | | 280.5 MSEC and On |

A problem may arise if the automobiles are traveling toward each other at a rapid rate. In this case a speed of 4 milliseconds or greater per sample would have an effect. In this example, the repeater will pick up every other signal sent by the master. The repeater cannot look for the signal when it first arrives because of this shorter distance. The signal would arrive before the 66 millisecond delay ends, but the repeater having missed one signal will pick up the next signal because it will not be in a delay loop at that time. This novel system can be used no matter what the relative speed between the sensor is by making the delay loops larger or smaller and by making longer delay times. Higher speeds can occur without missing any signals but this also results in a longer response time by the system so the application will control the timing.

The concept of this invention having repeater sensors and master sensors and associated delays can be applied to any system where two objects need detection of each other without interference from other sources.

In the event that there is occasional noise picked up by the sensors, the proper digital filters as one experienced in the art could be used to eliminate these problems. The missing of every other signal by the repeater at fast speeds would not hinder the operation of the system if slower response times by the system were acceptable.

I claim:

1. Distance measuring apparatus comprising a first and second ultrasonic device each including transmitting means for emitting an ultrasonic pulse and a receiving means for receiving ultrasonic pulses, a first control means connected to said transmitting and receiving means of said first device to activate each of said transmitting and receiving means at predetermined intervals; a second control means including timing means integral with said second device and responsive to signals received from said first device to activate the transmitting and receiving means of said second device at predetermined intervals; means for varying said predetermined time intervals as distance between the devices changes; means connected to said first device and responsive to reception of ultrasonic signals from said second device to measure the elapsed time from transmission of the pulse from said first device to reception of said pulse from said second device; means to convert the measured time lapse to a signal indicative of the distance between said devices.

2. An apparatus as claimed in claim 1, wherein said signal indicative of the distance between said devices is compared to a predetermined distance.

3. An apparatus as claimed in claim 1, wherein said control means includes pulsing means for generating ultrasonic pulses.

4. An apparatus as claimed in claim 3, wherein said control means includes timing means for activating and deactivating said second device.

5. An apparatus as claimed in claim 4, wherein said control means also includes means to render inactive the receiving means for a predetermined period of time after said second device transmits an ultrasonic pulse.

6. Method of detecting an object from a vehicle comprising the steps of: (a) transmitting a first ultrasonic pulse from a first sensor.; (b) receiving said pulse at a second sensor; (c) transmitting a second ultrasonic pulse from said second sensor a predetermined time after receiving said first pulse; (d) receiving said second delayed pulse at said first sensor; (e) measuring the time lapse including the predetermined delay at said second sensor to determine the distance between sensors; (f) Changing the predetermined time interval as the distance between sensors reaches predetermined values.

* * * * *